United States Patent
Mohr

[11] 3,794,802
[45] Feb. 26, 1974

[54] INDUCTION HEATING COIL
[75] Inventor: Glenn R. Mohr, Linthicum, Md.
[73] Assignee: Continental Can Company Inc., New York, N.Y.
[22] Filed: May 31, 1973
[21] Appl. No.: 365,602

[52] U.S. Cl............ 219/10.79, 219/9.5, 219/10.43, 219/10.69
[51] Int. Cl. ............................................ H05b 5/08
[58] Field of Search ....... 219/8.5, 9.5, 10.43, 10.53, 219/10.57, 10.67, 10.69, 10.71, 10.79; 228/6, 15, 23; 29/461, 497

[56] References Cited
UNITED STATES PATENTS
3,694,609  9/1972  Kennedy.......................... 219/10.79
2,818,483  12/1957  Blume............................. 219/8.5 X
3,336,459  8/1967  Seuler et al..................... 219/10.43

Primary Examiner—Bruce A. Reynolds
Attorney, Agent, or Firm—Diller Brown Ramik & Wight

[57] ABSTRACT

This disclosure relates to a heating coil for the induction heating of stripe-like areas of can bodies under controlled conditions utilizing electrical energy on the order of 10kHz and lower. The coil is of a unitary construction and is capable of substantially equally heating both the extreme end portions and the central portion heating of stripe-like areas of can bodies under

10 Claims, 4 Drawing Figures

PATENTED FEB 26 1974 3,794,802

INDUCTION HEATING COIL

This invention relates in general to new and useful improvements in induction heaters, and more specifically to a novel induction heating coil which is particularly adapted to be utilized in the heating of stripe-like areas of can bodies under controlled conditions.

It is well known that electrical energy may be induced into tubular bodies to effect an over-all heating of such bodies. It has also been bound by utilizing a conventional split coil heater, uniform heating of a stripe-like area on a tubular body can be obtained. However, a stripe-like area only of a can body cannot be heated at frequencies below 60 kHz. Such high frequency power is highly undesirable from the standpoint of necessary fueling, the existence of much metal in the work area of the transport mechanism for tubular bodies, particularly can bodies, and as well as the expensive equipment involved and the resultant power loss.

At the present time in the manufacture of can bodies, gas jets are most commonly used to produce the necessary heating. However, in many areas of the world gas is either not readily available as a fuel or the use of gas is too expensive. In a typical can body forming line, molten solder is applied to the side seam thereof. In order to make certain that sufficient solder is applied to each side seam, an excessive amount is applied and then this excessive amount must be wiped therefrom. However, the can body has a tendency to too quickly reduce the temperature of the solder so that it must be heated until it reaches the solder wiping station. At the present time, gas flames are utilized for such heating.

In accordance with this invention it is proposed to provide a single induction heating coil which will induce electrical energy into can bodies so as to provide for the necessary heating of a stripe-like area on each can body for the intended purpose. The coil is constructed to provide the necessary heating with a maximum frequency on the order of 10 kHz and below, preferably on the order of 3 kHz and the coil is so constructed wherein substantially the same heating occurs at the ends of the stripe-like area as occurs in the middle thereof.

In accordance with this invention, a single coil of very limited extent is provided and the coil is in effect a split lead coil and two regular coils all defined by a single winding.

With the above and other objects in view that will hereinafter appear, the nature of the invention will be more clearly understood by reference to the following detailed description, the appended claims and the several views illustrated in the accompanying drawings.

Figure 1:
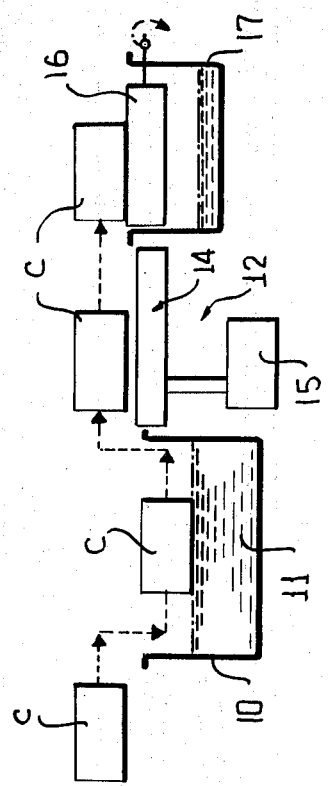
FIG. 1 is a schematic side elevational view of a side seam soldering system utilizing the coil of this invention.
Figure 4:
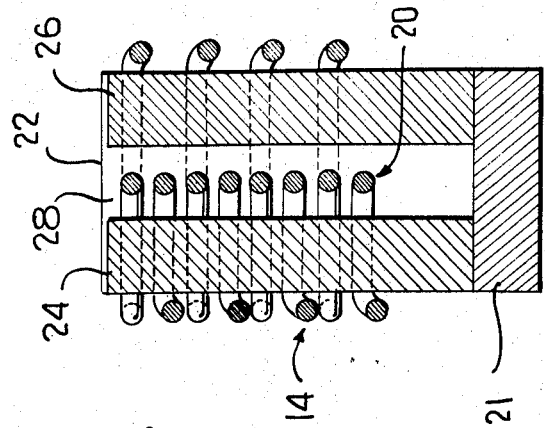
FIG. 4 is a transverse sectional view of the coil taken along the line 4—4 of FIG. 3.

Referring now to FIG. 1, it will be seen that there is schematically illustrated a solder line for soldering side seams of can bodies which are generally identified by the reference character C. A solder pot 10 having molten solder 11 therein is positioned along the path of travel of can bodies C and solder is applied to the side seam area of can bodies either by wiping the can body along the upper surface of the solder within the pot 10 or by means of a conventional solder applying roll (not shown). In any event, excess solder is applied to the can body and this excess solder must be wiped or brushed therefrom.

Normally, after the can body C has passed from the solder pot 10, the solder has set to the extent that it cannot be readily wiped therefrom. It is, therefore, necessary to maintain the temperature of the solder such that the excess solder may be subsequently wiped therefrom. For this purpose there is provided a heater unit which is identified by the numeral 12. The heater unit 12 includes an induction heating coil 14 which is suitably electrically connected to a high frequency generator 15. The heater unit 12 heats the can body only in the stripe-like area wherein solder has been applied thereto and maintains the necessary temperature of the solder on the can body C so that the excess solder may be readily wiped therefrom.

After the can body passes the heater assembly 12, it is engaged by a suitable wiper which is illustrated as a rotating wiper 16 with the wiped solder being generally collected in a collector 17.

While the length of the heating coil 14 has been exaggerated with respect to the length of the solder pot 10, and the collector 17, it is to be understood that it is relatively short and is positionable in the space normally provided between the solder pot 10 and the collector 17. Basically, the length of the heating coil 14 is on the order of 6 inches and need not exceed 9 inches in order to provide for the desired heating effect.

Figure 2:
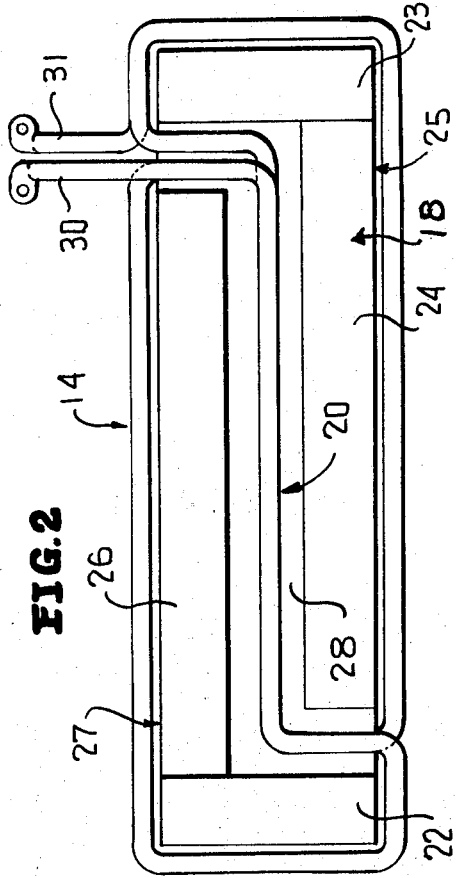
FIG. 2 is a plan view of the coil on a large scale.

Referring now to FIG. 2, it will be seen that the heating coil 14 basically includes a core 18 having a multiple turn winding 20 thereon. The core 18 is preferably formed of ferrite with the preferred ferrite being CEROMAG 24B, a product of Stackpole Carbon Co. of St. Mary's, Pennsylvania. The winding 20 is preferably in the form of copper tubing having an insulating cover in the form of a glass sleeving. The core 18 may also be formed of thin laminations of transformer steel on the order of 0.004 inch thick or slightly greater with the plane of the laminations being at 90° to the windings 20.

The core 18, which may be of a one piece construction, is illustrated as being formed from a number of pieces of ferrite and includes a base member 21 which has seated at the opposite ends thereof vertically extending, transversely disposed end pieces 22 and 23. A vertically extending side piece 24 is disposed along one edge of the base member 21 and extends from a point spaced from the end piece 22 into engagement with the end piece 23. The side piece 24 and the end piece 23 form a set of core pieces which is generally identified by the numeral 25.

Figure 3:
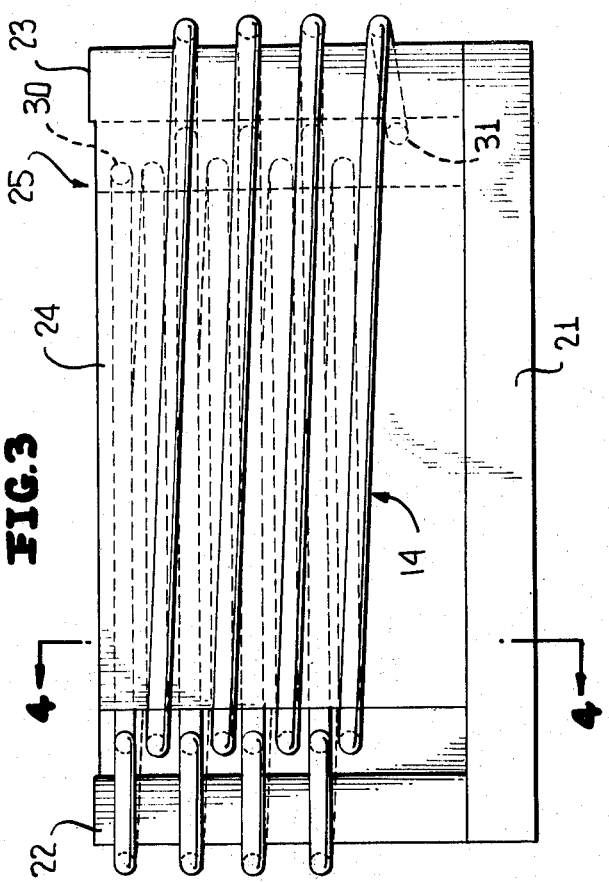
FIG. 3 is a side elevational view of the coil.

The core 18 further includes a side piece 26 which extends upwardly from the opposite side of the base member 21 from a point in engagement with the end piece 22 to a point spaced from the end piece 23. The end piece 22 and the side piece 26 combine to define a second set 27 of core pieces. It is to be noted that the core pieces 23, 24 and 26 define a vertically disposed, generally Z-shaped recess 28 therebetween in overlying relation to the base member 21. It is also to be noted from FIG. 3 that the end pieces 22, 23 project vertically above the side pieces 24, 26 a slight difference, preferably on the order of 1/16 inch. If necessary, the end pieces 22,23 could be transversely rounded at their upper ends so as to more closely fit relative to the path of moving can bodies.

Referring now to FIG. 2 once again, it will be seen that the winding 20 includes a first lead 30 from the source of high frequency electrical energy with this lead entering into the recess 28 and passing around the core piece set 27 and back into the recess 28. The next turn of the winding 20 is about the core piece set 25. The winding continues in alternating relation around the core piece sets 25 and 27 and terminates in a second lead 31.

It is to be noted that current flow in those portions of the winding 20 which are disposed within the recess 28 is all in the same direction with the result that the portions of the winding 20 which extend longitudinally of the core define a split lead coil having parallel current flow. In a like manner, those portions of the windings which extend around the end pieces 22,23 define separate coils which function to primarily heat the extreme end portions of the stripe-like area of a can body which the heating coil 14 is designed to heat. In effect, the longitudinal portions of the windings substantially uniformly heat a stripe-like area of a can body along all portions thereof except the end portions and the portions of the winding extending around the end pieces 22 and 23 primarily heat the end portions and the combined heating is one of substantially uniformity.

It is particularly pointed out here that a coil having an over-all length of 8 inches and an over-all core height of slightly over 3 inches with a power input on the order of 8.35 kHz and a total power requirement of 1.5 kw will produce in can bodies having a metal thickness of 0.010 inch and moving at the rate of 80 cans per minute a temperature rise on the order of 150° F. with the solder temperature applied to the can being on the order of 720° F. to 740° F.

It is also to be understood that the heating coil 14 has the winding thereof suitably potted relative to the core and that the heating coil must withstand a temperature of 800° F.

Although only a single embodiment of the heating coil and utilization thereof has been specifically illustrated and described herein, it is to be understood that minor variations may be made in the construction of the heating coil and the utilization thereof without departing from the spirit and scope of the invention, as defined by the appended claims.

I claim:

1. A heating coil particularly adapted for heating a relative moving body uniformly along a stripe-like area, said heating coil comprising a core formed of sets of end pieces and longitudinal pieces arranged to define therebetween a longitudinally elongated generally Z-shaped recess, and a winding positioned in said recess and encircling said sets of end pieces and longitudinal pieces.

2. The heating coil of claim 1 wherein all of said winding in said recess is arranged for current flow therethrough in the same direction.

3. The heating coil of claim 1 wherein said core includes a base member.

4. The heating coil of claim 1 wherein said core is formed of ferrite.

5. The heating coil of claim 1 wherein said winding is in the form of copper tubing with an insulating sleeving.

6. The heating coil of claim 1 wherein said core includes a base member and said recess opens only towards an intended path of movement of tubular members.

7. The heating coils of claim 6 wherein said end pieces project from said base beyond said longitudinal pieces.

8. The heating coil of claim 1 together with a source of electrical energy coupled to said winding, the frequency of said course of electrical energy being on the order of 10kHz and below.

9. The heating coil of claim 1 wherein said heating coil is part of a mechanism for forming can bodies having side seams, and said Z-shaped recess has a longitudinal portion aligned with a path of movement of can body side seams.

10. The heating coil of claim 9 wherein said mechanism includes solder applicator means and excess solder removal means, and said heating coil is positioned between said solder applicator means and said excess solder removal means for maintaining an elevated temperature of the solder carried by a can body to facilitate removal thereof.

* * * * *